US012659242B2

(12) United States Patent
Singh et al.

(10) Patent No.: US 12,659,242 B2
(45) Date of Patent: Jun. 16, 2026

(54) ENHANCED 5G SBI TRAFFIC FEED FOR 5G WIRELESS NETWORK MONITORING AND ANALYSIS

(71) Applicant: Oracle International Corporation, Redwood City, CA (US)

(72) Inventors: Virendra Singh, Bengaluru (IN); Jay Rajput, Bengaluru (IN); Abhilash Valappil Kunnummal, Apex, NC (US)

(73) Assignee: Oracle International Corporation, Redwood City, CA (US)

( * ) Notice: Subject to any disclaimer, the term of this patent is extended or adjusted under 35 U.S.C. 154(b) by 193 days.

(21) Appl. No.: 18/526,484

(22) Filed: Dec. 1, 2023

(65) Prior Publication Data

US 2025/0184238 A1     Jun. 5, 2025

(51) Int. Cl.
*H04L 41/5009*     (2022.01)

(52) U.S. Cl.
CPC ............................... *H04L 41/5009* (2013.01)

(58) Field of Classification Search
CPC ...... H04L 41/5009; H04L 43/12; H04L 43/18
See application file for complete search history.

(56) References Cited

U.S. PATENT DOCUMENTS

| | | | |
|---|---|---|---|
| 2020/0187060 A1* | 6/2020 | Yau | H04W 36/0022 |
| 2022/0053372 A1* | 2/2022 | Shekhar | H04L 67/56 |
| 2022/0360561 A1* | 11/2022 | Rajput | H04L 63/0227 |

* cited by examiner

*Primary Examiner* — Joe Chacko

(57) ABSTRACT

The technology disclosed herein enables 5G wireless monitoring and analysis using an enhanced feed of 5G SBI traffic. In a particular example, a method includes receiving a 5G SBI message in a Service Communication Proxy (SCP), extracting information from protocols used to transmit the 5G SBI message, and including the information in a mirror message with a copy of a payload of the 5G SBI message. The method further includes transmitting the mirror message to a monitoring system.

20 Claims, 7 Drawing Sheets

100

400

| L7 APP. (TAP) |
| PAYLOAD 501 |
| L5, L6 TLS |
| L4 TCP |
| L3 IP |
| L2 ENET |

MIRROR STACK 402

| L7 APP. (TAP) |
| L7 HTTP/2 |
| L5, L6 TLS |
| L4 TCP |
| L3 IP |
| L2 ENET |

5G SBI STACK 401

500

TCP/TLS DATA 511
(SCP 101 TO MONITOR 102)

JSON PAYLOAD 501

METADATA
502

SBI MESSAGE
HEADERS
503

SBI MESSAGE COPY
504

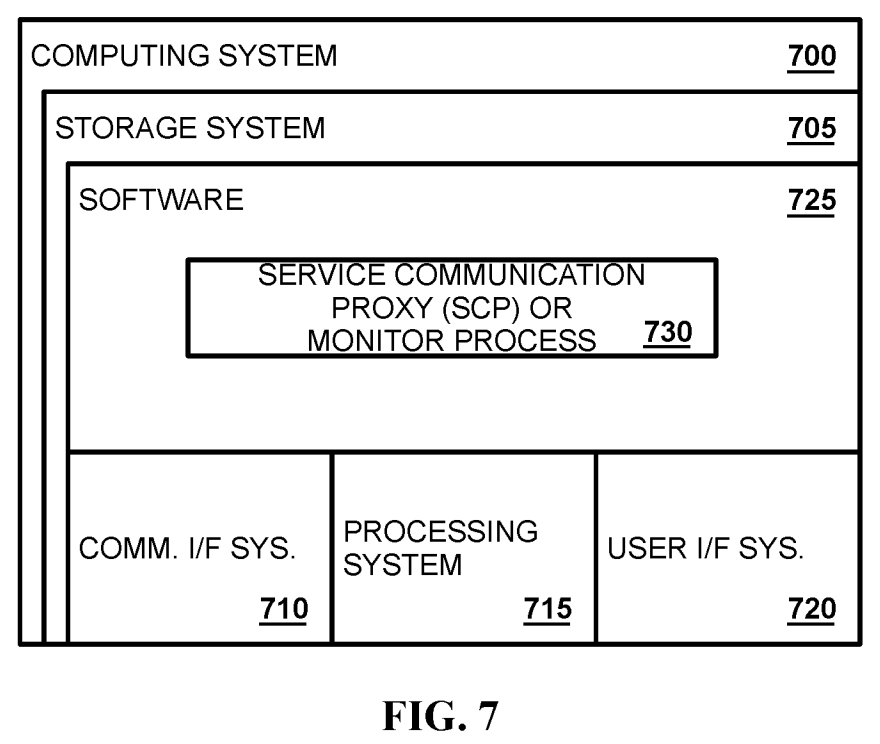

COMPUTING SYSTEM                                      700

STORAGE SYSTEM                                        705

SOFTWARE                                              725

SERVICE COMMUNICATION
PROXY (SCP) OR
MONITOR PROCESS          730

COMM. I/F SYS.          710

PROCESSING
SYSTEM          715

USER I/F SYS.          720

FIG. 7

ENHANCED 5G SBI TRAFFIC FEED FOR 5G WIRELESS NETWORK MONITORING AND ANALYSIS

BACKGROUND

The Service-Based Architecture (SBA) of $5^{th}$ Generation (5G) wireless networks is designed to be flexible, scalable, and agile. SBA signaling in a 5G network is the exchange of messages between network functions (NFs) to control and manage network resources and services. SBA signaling is based on a set of standardized protocols and interfaces, which allows NFs from different vendors to interoperate seamlessly. This makes it possible to deploy and manage 5G networks in a more efficient and cost-effective manner. SBA signaling enables NFs to discover the capabilities of other NFs and to register themselves with the network. NFs further use SBA signaling to establish and manage connections with each other, which allows them to exchange data and control messages, and exchange service information, such as the type of service they provide and the network resources they require. NFs also use SBA signaling to monitor and manage network performance, which helps to ensure that the network is operating efficiently and reliably.

A Service-Based Interface (SBI interface) is a standardized communication protocol used for SBA signaling. SBI interfaces facilitate communication between NFs, allowing them to discover, register, establish connections, exchange service information, monitor network performance, and control network resources, as noted above. These interactions enable NFs to collaborate effectively in delivering various 5G services, such as enhanced mobile broadband (eMBB), ultra-reliable low-latency communication (URLLC), and massive machine-type communication (mMTC). SBI interfaces are based on open standards, ensuring interoperability between NFs from different vendors. This promotes a diverse and competitive ecosystem of NF providers, fostering innovation and cost-effectiveness in 5G network deployments.

A Service Communication Proxy (SCP) as an SCP is a centralized NF of a 5G core network through which 5G SBI messages of the SBI interface pass. The SCP can route messages between NFs based on various factors, such as the type of message, the NF's capabilities, and the current network conditions. This helps to ensure that messages are delivered efficiently and reliably. The SCP can help to ensure that the 5G network is resilient to failures. If an NF fails, the SCP can reroute messages to another NF.

SUMMARY

The technology disclosed herein enables 5G wireless monitoring and analysis using an enhanced feed of 5G SBI traffic. In a particular example, a method includes receiving a 5G SBI message in a Service Communication Proxy (SCP), extracting information from protocols used to transmit the 5G SBI message, and including the information in a mirror message with a copy of a payload of the 5G SBI message. The method further includes transmitting the mirror message to a monitoring system.

In other examples, an apparatus performs the above-recited method and program instructions stored on computer readable storage media direct a processing system to perform the above-recited method.

In another example, a method includes, in a monitoring system, receiving a mirror message from a SCP. The mirror message includes information the SCP extracted from protocols used to transmit a 5G SBI message to the SCP and a copy of a payload of the 5G SBI message. In the monitoring system, the method further includes identifying a transaction identifier for the 5G SBI message from the information and associating the 5G SBI message with a transaction along with one or more other 5G SBI messages based on the transaction identifier.

In other examples, an apparatus performs the above-recited method and program instructions stored on computer readable storage media direct a processing system to perform the above-recited method.

BRIEF DESCRIPTION OF THE DRAWINGS

FIG. 7 illustrates a computing system for 5G network monitoring and analysis using an enhanced 5G SBI traffic feed.

DETAILED DESCRIPTION

Given the centralized logical location of an SCP in a 5G network, network operators may be required to enable SBA control plane monitoring and analysis using traffic acquisition for all 5G SBI interfaces connected to the SCP for full 5G SBI traffic visibility within the 5G Core network. If the SCP simply sends to a monitoring system a copy of a 5G SBI message passing through the SCP (i.e., mirrors the 5G SBI message), there is information that will not be included with the copy. For example, source and destination identifiers for the 5G SBI message will not be included in the message copy. Moreover, encrypted 5G SBI communication may be unreadable by the monitoring system.

Platform-level mirroring of messages may be used to provide additional information about 5G SBI messages. Platform-level mirroring is a uniform solution for all message flows in the 5G network and can monitor all network flows, not just 5G SBI messages. However, platform-level mirroring requires privileged access to the platform. Platform-level mirroring also has higher operations complexity. For instance, the operations include administration of mirror filters and security credentials in a dynamic environment. Platform-level mirroring further requires extra decrypting and unpacking of messages and more elements would be affected should the mirroring function fail.

Application-Level Mirroring is another mechanism to provide additional information about 5G SBI messages. Unlike platform-level mirroring, application-level mirroring does not require privileged access to the platform. Application-level mirroring also has lower operations complexity with no extra decrypting or unpacking since the application decrypts and unpacks messages already. Should the mirroring function fail, fewer elements will be affected than when using platform-level mirroring. Application-level mirroring is a non-uniform solution in the sense that taps are implemented within different applications and may have different implementations. Application-level mirroring also only monitors network flows used by the targeted application.

Even if application-level mirroring is preferred over platform-level mirroring due to it not requiring privileged access to the platform, application-level mirroring does not provide information, such as identification of the consumer NF and producer NF, transport protocol information, information necessary to correlate requests & responses, message timestamp, etc. The SCP described below improves upon application-level mirroring by mirroring the 5G SBI message flow through the SCP to a monitoring system while including the additional information that traditional application-level mirroring lacks. The monitoring system can then perform additional analysis on the 5G SBI messages that it otherwise could not have performed.

Figure 1:
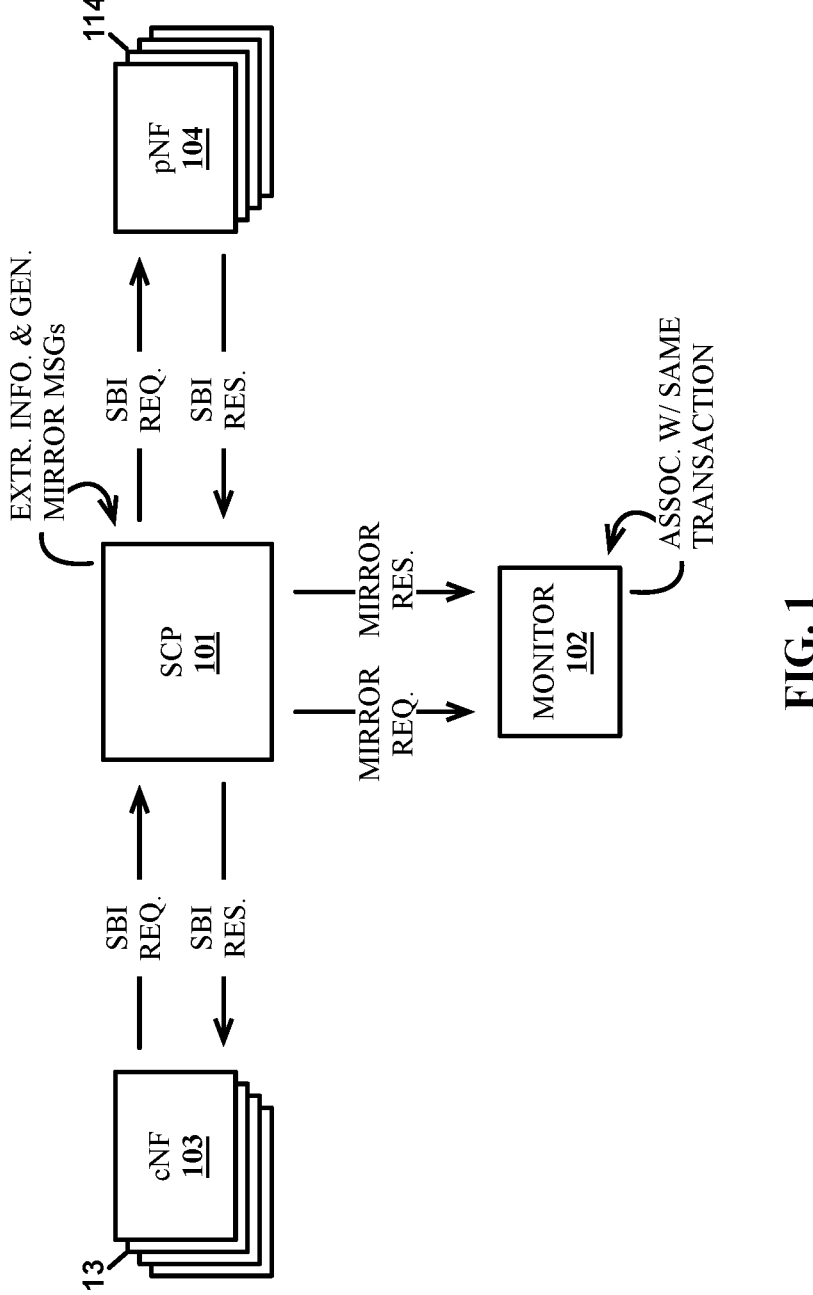
FIG. 1 illustrates an implementation for 5G network monitoring and analysis using an enhanced 5G SBI traffic feed.

FIG. 1 illustrates implementation 100 for 5G network monitoring and analysis using an enhanced 5G SBI traffic feed. Implementation 100 includes SCP 101, monitor 102, consumer NFs 113, and producer NFs 114, which are part of a 5G wireless network. Consumer NFs 113 includes consumer NF 103 and producer NFs 114 include producer NF 104. Although not shown, the elements of implementation 100 may communicate over logical communication links implemented using physical computing systems, network devices, and communication links.

Consumer NFs 113 are responsible for providing specific services to end users while producer NFs 114 are responsible for providing data and services to consumer NFs 113. Consumer NFs 113 may include a Policy Control Function (PCF), Application Function (AF), Network Slice Function (NSFF), User Equipment (UE) Lifecycle Management Function (ULM), Charging Function (CHF), Traffic Management Function (TMF), Downlink (DL) and Uplink (UL) Packet Processing Functions (PPFs), or any other type of consumer NF that may be employed by a 5G wireless network. Producer NFs 114 may include a Session Management Function (SMF), Access and Mobility Management Function (AMF), Authentication Function (AUTH), Unified Data Management Function (UDM), Policy Function (PF), Network Repository Function (NRF), Network Slice Management Function (NSMF), or any other type of producer NF that may be employed by a 5G wireless network.

SCP 101 acts as a central hub for handling and routing signaling messages exchanged between consumer NFs 113 and producer NFs 114. It simplifies the network topology of the 5G network by eliminating direct connections between NFs, reducing the complexity of 5G SBI message routing. SCP 101 may perform load balancing and overload handling to distribute the load of 5G SBI messages across multiple NFs, preventing any single NF from becoming overloaded. SCP 101 may also standardize the formats and parameters of 5G SBI messages, ensuring compatibility between different NFs (e.g., NFs from different vendors). SCP 101 communicates with monitor 102, which is a monitoring system for the 5G wireless network. Monitor 102 may be part of a comprehensive network analytics platform designed to provide real-time insights into the performance, behavior, and health of 5G networks. Monitor 102 may collect and analyze data from various network elements, including User Equipment (UE), Core Network (CN), and User Plane Function (UPF), to provide visibility into network traffic, resource utilization, and potential issues with the 5G network. In the examples below, the data used by monitor 102 includes the mirror flows of 5G SBI messages received from SCP 101, as described below.

Figure 2:
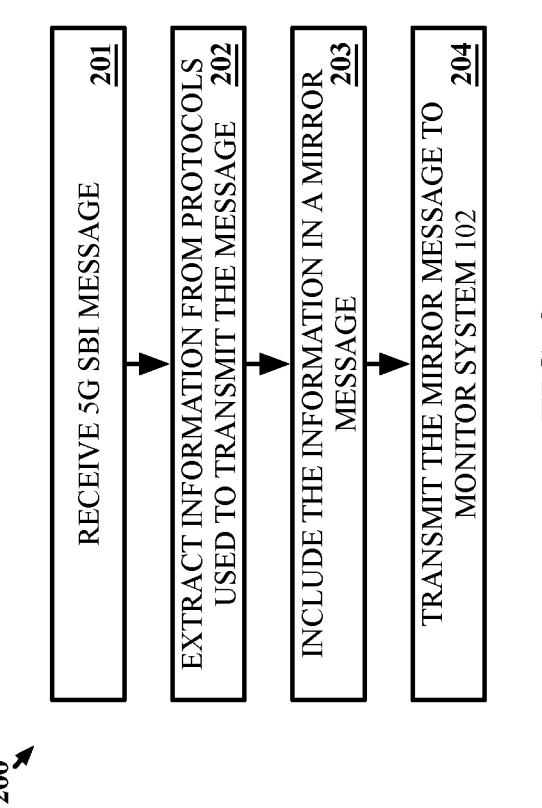
FIG. 2 illustrates an operation to monitor and analyze a 5G network using an enhanced 5G SBI traffic feed.

FIG. 2 illustrates operation 200 to monitor and analyze a 5G network using an enhanced 5G SBI traffic feed. In operation 200, SCP 101 receives a 5G SBI message (step 201). 5G SBI messages are typically formatted using JavaScript Object Notation (JSON) and exchanged using the HTTP/2 revision of the Hypertext Transfer Protocol (HTTP), although other formatting and protocols may be used. JSON is a lightweight data-interchange format that uses human-readable text to store and transmit data objects. The data object in this case includes the information exchanged in the received 5G SBI message. The 5G SBI message may be a request to register with a NF, a request to establish a session with a NF, a notification message, a response to a request, or a message associated with any other function supported by the SBA of the 5G network. The 5G SBI message may be received from any of consumer NFs 113 and producer NFs 114. In the example of implementation 100, SCP 101 receives a 5G SBI request message from consumer NF 103 and a 5G SBI response message from producer NF 104 responding to the request.

Upon receiving the 5G SBI message, SCP 101 extracts information from protocols used to transmit the 5G SBI message (step 202). The information may include any data that is not included in the payload of the 5G SBI message. For example, the information may include an Internet Protocol (IP) address of a source of the 5G SBI message, an IP address of a destination of the 5G SBI message, a source port of the 5G SBI message, a destination port of the 5G SBI message, a stream identifier (Stream ID) of the 5G SBI message, and any request/response headers for the 5G SBI message. The Stream ID of HTTP/2 is a unique identifier for a bidirectional stream of data within an HTTP/2 connection. Stream IDs are unsigned 31-bit integers and are used to identify different streams within the same connection. This allows multiple streams to be multiplexed over a single Transmission Control Protocol (TCP) connection, which can improve performance by reducing overhead and latency. As such, SCP 101 may receive 5G SBI messages for different transactions over the same TCP connection and each of the transactions may receive a different Stream ID.

The HTTP/2 information may include standard HTTP/2 headers and custom headers for HTTP/2 defined by the 3rd Generation Partnership Project (3GPP) that develops and maintains 5G network standards. TCP information for the 5G SBI message may include the source port, the destination port, the sequence number, the next sequence number, the acknowledgement number, header length, flags (e.g., Congestion Window Reduced (CWR), ECN-Echo, Urgent, Acknowledgment, Push, Reset, Syn, Fin), window size, a checksum, or some other type of information that may be used by TCP. IP information may include the source IP address, the destination IP address, the IP version, the header length, a time to live, the transport protocol being used (TCP in this example but other transport protocols may be used), a header checksum, or some other type of information that may be used by IP.

In some examples, HTTP/2 may use header compression called HPACK. HTTP/2 Headers are often repeated, which may consume a lot of bandwidth and increase latency. To reduce this overhead and improve performance, HTTP/2 compresses headers using HPACK. HPACK is a table lookup compression scheme that leverages Huffman encoding to get compression rates that approach the popular Gzip file compression format. HPACK requires that both client and server maintain and update an indexed list of previously seen header fields (i.e., establishes a shared compression context), which is then used as a reference to efficiently encode/decode previously transmitted values. To decode the HTTP2 headers of a 5G SBI message, the receiving system, including monitor 102 described below, needs HPACK index tables are maintained and updated (similar to an HTTP/2 Server). If any HTTP/2 message is missed, then HTTP/2 headers in further 5G SBI messages cannot be decoded.

SCP 101 includes the information extracted from the 5G SBI message in a mirror message with a copy of the 5G SBI message payload (step 203). The information is included because the transmitting the mirror message from SCP 101 to monitor 102 will use different information for the protocols. For example, the source and destination addresses for the mirror message will be IP addresses of SCP 101 and monitor 102, respectively, rather than the original addresses for the 5G SBI message received by SCP 101. As such, if SCP 101 simply transmitted a copy of the payload to monitor 102, monitor 102 would not receive the original addresses and could not factor those addresses into its network analysis. The information may be included as metadata in a new JSON payload that also includes the 5G SBI message payload. Other formats may also be used for the payload. SCP 101 then transmits the mirror message to monitor 102 (step 204). The mirror message may be transmitted using the same protocols that were used to transmit the 5G SBI message, although, other protocols may be used instead.

In an example of operation 200 in the context of the messages exchanged in implementation 100, SCP 101 receives an 5G SBI request message from consumer NF 103. SCP 101 extracts information from the 5G SBI request message and generates a mirror message of the 5G SBI request message including the information and the payload of the 5G SBI request message. SCP 101 forwards the 5G SBI request message to producer NF 104 and sends the mirror message to monitor 102. SCP 101 may select producer NF 104 from producer NFs 114 or the 5G SBI request message may be directed to producer NF 104 from consumer NF 103 with SCP 101 being an intermediate hop. Producer NF 104 responds to the 5G SBI request message by sending an 5G SBI response message. SCP 101 receives the 5G SBI response message and performs the same information extraction and mirror message generation as was performed on the 5G SBI request message. SCP 101 forwards the 5G SBI response message to consumer NF 103 and sends the mirror message to monitor 102. Though not shown, other messages received by SCP 101 may also be mirrored with extracted information and sent to monitor 102. Monitor 102, therefore, may receive a mirrored feed of 5G SBI messages passing through SCP 101.

Based on timestamps for two 5G SBI messages indicated in the two mirror messages monitor 102 determines that the 5G SBI response message was received after the 5G SBI request message. Information in the mirror messages (e.g., a transaction identifier) may further enable monitor 102 to associate the two 5G SBI messages with the same transaction (i.e., determine that the 5G SBI response is in response to the 5G SBI request message of this example rather than some other request). While this example only mirrors messages received by SCP 101, other examples may mirror messages sent from SCP 101. For example, the 5G SBI request message may be mirrored to monitor 102 both as it is received by SCP 101 (e.g., with SCP 101 as the destination) and as it is transmitted from SCP 101 (e.g., with producer NF 104 as the destination).

Figure 3:
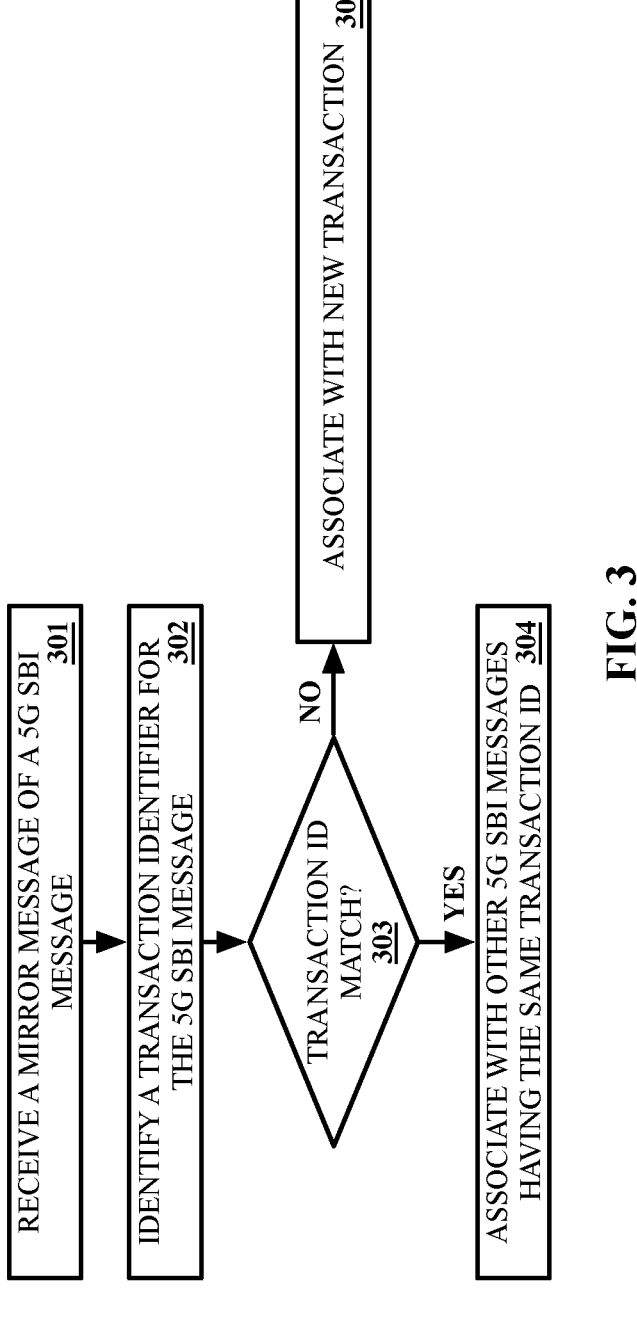
FIG. 3 illustrates an operation to monitor and analyze a 5G network using an enhanced 5G SBI traffic feed.

FIG. 3 illustrates operation 300 to monitor and analyze a 5G network using an enhanced 5G SBI traffic feed. In operation 300, monitor 102 receives a mirror message from SCP 101 (step 301). The mirror message includes information extracted from an 5G SBI message received by SCP 101 and a copy of the payload of that 5G SBI message. For example, the mirror message may be the mirror message transmitted at step 204 above. Monitor 102 identifies a transaction identifier in the extracted information included in the mirror message (step 302). The transaction identifier may be included in a custom HTTP/2 header when sent from consumer NF 103. SCP 101 extracted the transaction identifier in the HTTP/2 header information from the received 5G SBI message and included the header information in the mirror message.

Monitor 102 determines whether the transaction identifier matches a transaction identifier from mirror messages already received by monitor 102 (step 303). If the transaction identifier matches, monitor 102 associates the 5G SBI message mirrored by the mirror message with the other 5G SBI messages having the same identifier (step 304). This enables monitor 102 to process 5G SBI messages associated with the same transaction to better analyze the 5G network. If the transaction identifier does not match, monitor 102 associates the 5G SBI message with a new transaction and subsequent mirror messages indicating the same transaction identifier will then be associated with the 5G SBI message (step 305). By associating 5G SBI messages with respective transactions, monitor 102 may be able to determine how specific transactions are being handled by the 5G network, which monitor 102 cannot do if it is unaware of the associated transactions.

Similarly, in some examples, monitor 102 may identify a hop-by-hop identifier in the extracted information. For instance, the hop-by-hop identifier may be included in another custom HTTP/2 header for the 5G SBI message. The hop-by-hop identifier indicates a hop through the 5G network taken by the 5G SBI message since SCP 101 may be one of many hops taken by the 5G SBI message and some or all of those hops may also provide a mirror message feed to monitor 102. As such, monitor 102 can track the 5G SBI message's progress through the 5G network by recognizing the hops indicated by the hop-by-hop identifiers in the received mirror messages.

The transaction identification performed in operation 300 is only one example of the analysis that can be performed by monitor 102. Monitor 102 may perform consumer NF identification using the information in a mirror message. Specifically, an Authenticated Consumer NF identity (TLS cert info, NF Type, and NF instance Id) may be needed for many of the analysis scenarios to properly assess 5G network activity relative to particular ones of consumer NFs 113. All 5G SBI request messages will have a fully qualified domain name (FQDN) and/or IP address of the producer NF but do not have an identity of the producer NF. Thus, identifying the producer NF can help monitor 102 in analyzing the 5G SBI message flows to producer NF instance level granularity. Monitor 102 may also perform message filtering based on Nx interface (e.g., N11, N12, N26, etc.) of the 5G SBI message indicated in the additional information. Nx interfaces refer to the standardized reference points or connection points between different functional elements or network domains. In the context of a 5G network, the N11 interface connects the UE to the gNodeB and is responsible for transporting user data, signaling messages, and control plane information between the UE and the core network. The N12 interface connects the gNodeB to the UPF responsible for packet forwarding and routing of user data traffic between the core network and the UE. Monitor 102 analyze the 5G SBI message for a specific point to point (Nx) interface. It requires the information to include 5G NF identity of message source and destination (e.g., consumer NF 103 may be the source and producer NF 104 may be the destination). Even if monitor 102 received the HTTP2 headers along with the message payload, monitor 102 will not be able to perform the above determinations. Therefore, SCP 101 includes identifiers for the consumer NF, producer NF, transport protocol, request & response correlation information, message, timestamp etc. in the metadata of the mirror message. That metadata enables monitor 102 to analyze and correlate the 5G SBI request/response messages, map messages to consumer/producer NF instances, and perform message filtering for specific 5G SBI Nx interfaces and TLS level details. This type of analysis may be particularly beneficial to make sense of 5G SBI message exchanges in 5G cloud native network deployments where network functions are dynamically discovered, configured, provisioned, deployed, and reused.

Figure 4:
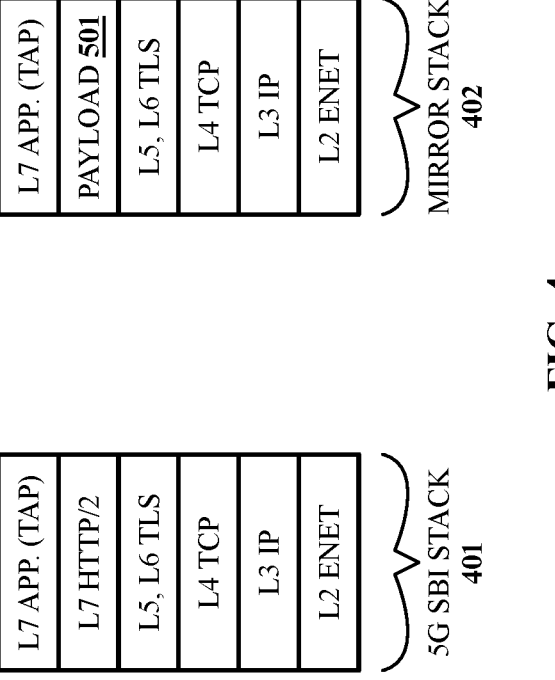
FIG. 4 illustrates protocol stacks for 5G network monitoring and analysis using an enhanced 5G SBI traffic feed.

FIG. 4 illustrates protocol stacks 400 for 5G network monitoring and analysis using an enhanced 5G SBI traffic feed. Protocol stacks 400 include 5G SBI stack 401 and mirror message stack 402. 5G SBI stack 401 is an example protocol stack for an 5G SBI message received by SCP 101. 5G SBI stack 401 shows six of the seven layers of the Open Systems Interconnection (OSI) model providing a conceptual framework for understanding how data is transmitted across a network. Each layer performs a specific function in the overall process of data communication, from the physical transmission of bits to the interpretation of application-level data. Layer 1 is not shown but includes the physical layer of the OSI model and is responsible for the physical transmission of raw data bits over a physical medium, such as copper cables, fiber optic cables, or wireless signals. Layer 2 (L2) is the data link layer responsible for organizing raw data bits into frames, which are units of data that can be reliably transmitted over the physical layer. Layer 3 (L3) is the network layer responsible for routing data packets across the network. Layer 4 (L4) is the transport layer that provides reliable data transmission between applications. L4 segments data into segments, ensures the correct ordering of segments, and handles error detection and recovery. Layer 5 (L5) is the session layer that manages the dialogue between applications, establishing, maintaining, and terminating communication sessions. Layer 6 (L6) is the presentation layer that formats and encrypts data, ensuring that it is compatible with the receiving application. Layer 7 (L7) is the application layer that provides network services to applications.

In this case, L2 uses the Ethernet protocol, L3 uses IP, L4 uses TCP, and L5/6 use Transport Layer Security (TLS) protocol. L7 of 5G SBI stack 401 indicates the NF application uses HTTP/2 to transmit 5G SBI messages and an application tap extracts the HTTP/2 headers and payloads from the messages. Mirror message stack 402 is similar to 5G SBI stack 401 but mirror message stack 402 includes JSON payload 501 in place of the HTTP/2 message in 5G SBI stack 401.

Figure 5:
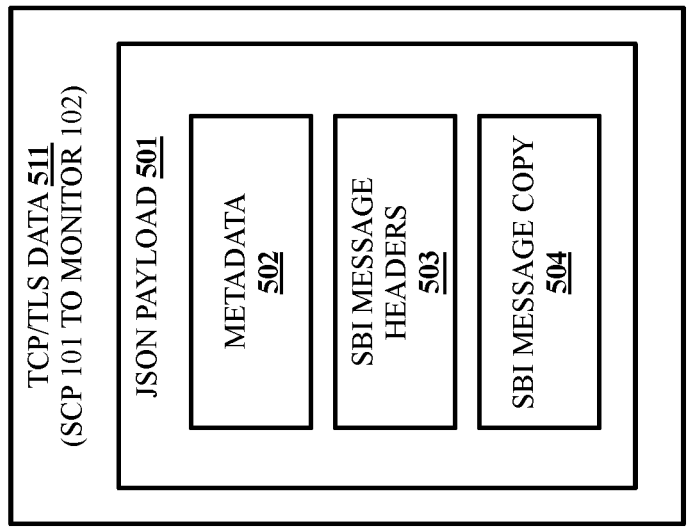
FIG. 5 illustrates a mirror message format for 5G network monitoring and analysis using an enhanced 5G SBI traffic feed.

FIG. 5 illustrates mirror message format 500 for 5G network monitoring and analysis using an enhanced 5G SBI traffic feed. Mirror message format 500 is an example format for the mirror messages SCP 101 generates and transmits to monitor 102. TCP/TLS data 511 is different for the mirror message than it is for the 5G SBI message being mirrored because the mirror message is being transmitted from SCP 101 to monitor 102 rather than from one NF to another or to SCP 101. TCP/TLS transports JSON payload 501, although formats other than JSON may also be used. JSON payload 501 includes metadata 502, SBI message headers 503, and 5G SBI message copy 504. 5G SBI message copy 504 is the copy of the HTTP/2 payload of the 5G SBI message received by SCP 101. The HTTP/2 payload may already be a JSON formatted payload that can be inserted into JSON payload 501. In some examples, SCP 101 may reformat the HTTP/2 payload for insertion into JSON payload 501. SBI message headers 503 includes the HTTP/2 headers for the 5G SBI message received by SCP 101. As noted above, the HTTP/2 headers are necessary if HPACK compression is used. Otherwise, when monitor 102 receives the mirror message, monitor 102 will not be able to decrypt the compression. When creating the mirror message, SCP 101 may include at least some of the information from SBI message headers 503 in metadata 502 or monitor 102 may extract the information from SBI message headers 503 itself.

Metadata 502 may include a timestamp indicating when SCP 101 receives the 5G SBI message, a transaction identifier, a hop-by-hop identifier, request/response correlation information (e.g., a connection identifier, a socket descriptor identifier, and an HTTP2 stream identifier), information about the consumer NF (e.g., a TLS certificate, NF type, and NF instance identifier), information about the producer NF (e.g., NF instance identifier, NF type, and information about the service provided), information about SCP 101 (e.g., information about the service or pod implementing SCP 101), or any other type of information that can be extracted from an 5G SBI message—including combinations thereof.

Figure 6:
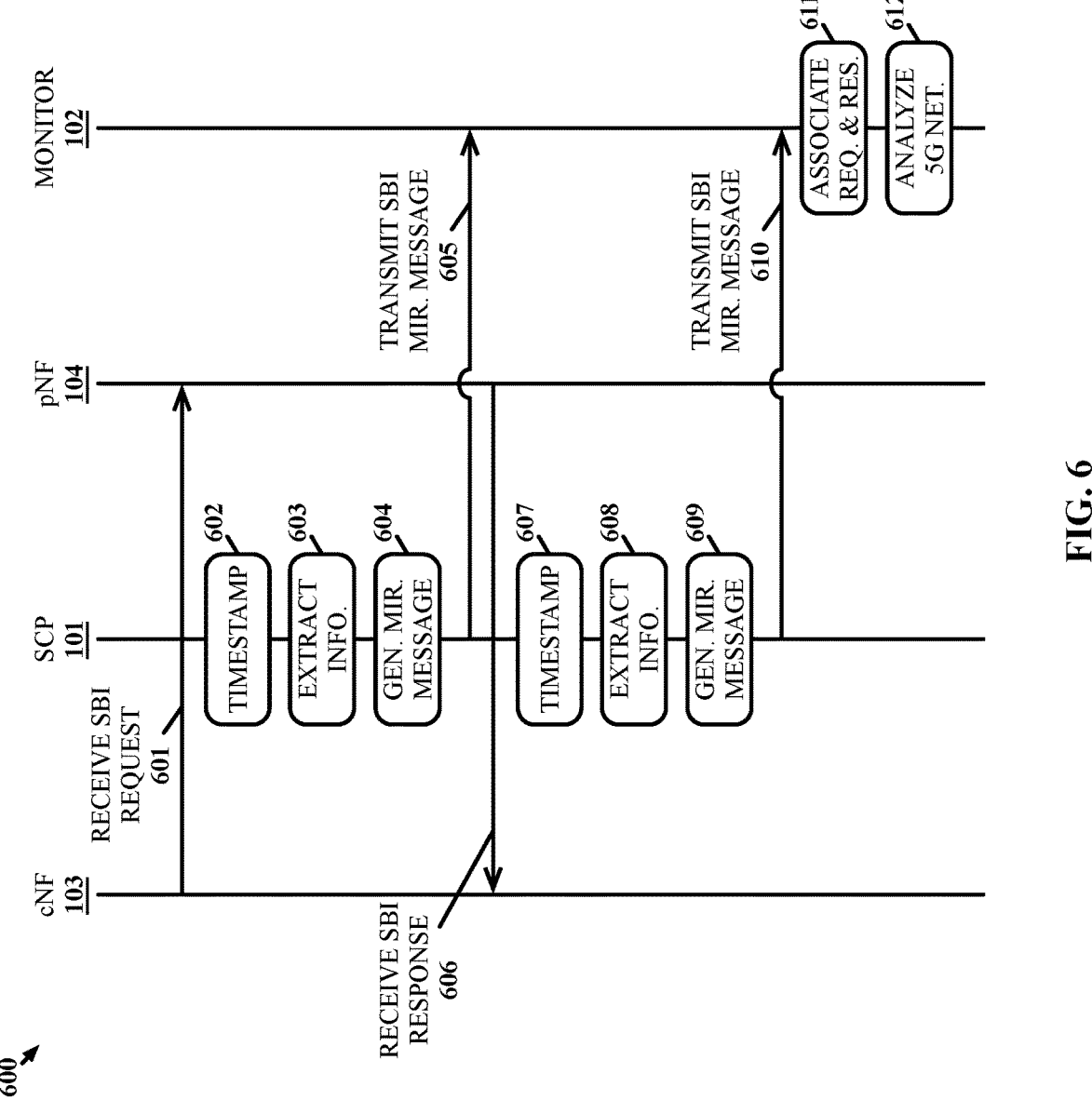
FIG. 6 illustrates an operational scenario for 5G network monitoring and analysis using an enhanced 5G SBI traffic feed.

FIG. 6 illustrates operational scenario for 5G network monitoring and analysis using an enhanced 5G SBI traffic feed. In operational scenario 600, SCP 101 receives an 5G SBI request message from consumer NF 103 (step 601). In this example, SCP 101 forwards the 5G SBI request message to producer NF 104. Consumer NF 103 may direct the 5G SBI request message to producer NF 104 specifically or SCP 101 may include logic that selected producer NF 104 from producer NFs 114 to receive the 5G SBI request message. The 5G SBI request message may include a request for a connection, a request for registration, a request for a session, or any other type of request provided for by the SBA. SCP 101 creates a timestamp for the 5G SBI request message upon receipt (step 602). SCP 101 extracts information from the 5G SBI request message (step 603) and includes the information along with the timestamp in metadata when generating a mirror message (step 604). The mirror message may use mirror message format 500 to include metadata, SBI message headers, and a copy of the 5G SBI request message payload. SCP 101 then transmits the mirror message to monitor 102 (step 605).

After producer NF 104 receives the 5G SBI request message, producer NF 104 responds to the 5G SBI request message by transmitting a 5G SBI response message to consumer NF 103 (step 606). In this example, SCP 101 forwards the 5G SBI response message to consumer NF 103 upon receipt. As with the 5G SBI request message above, SCP 101 creates a timestamp for the 5G SBI response message upon receipt (step 607). SCP 101 extracts information from the 5G SBI response message (step 608) and includes the information along with the timestamp in metadata when generating a mirror message (step 609). The mirror message may use mirror message format 500 to include metadata, SBI message headers, and a copy of the 5G SBI request message payload. SCP 101 then transmits the mirror message to monitor 102 (step 610).

After receiving both mirror messages, monitor 102 uses request/response correlation information in the two mirror messages to determine that the 5G SBI request message and the 5G SBI response message correspond to one another (step 611). Monitor 102 may then analyze the performance of the 5G network based on the association between the request and the response (step 612). For example, monitor 102 may determine performance metrics for the 5G network based on characteristics of specific request and response pairs rather than characteristics of requests and responses in general without knowing which requests correspond to which responses. It should be understood that, while only two 5G SBI messages are present in operational scenario 600, SCP 101 may mirror many, if not all, of the 5G SBI messages passing therethrough. Likewise, while SCP 101 mirrors the received 5G SBI messages in operational scenario 600, SCP 101 may also mirror outbound messages from SCP 101. For example, SCP 101 may change an 5G SBI message based on processing performed in SCP 101 and monitor 102 may be interested in those changes for analysis. Thus, SCP 101 may send both the received version of the 5G SBI message and the transmitted version. Also, while SCP 101 performs the message mirroring in the examples above, other network components may perform the message mirroring in other examples. The other components may perform the mirroring instead of SCP 101 or in addition to SCP 101 (e.g., examples where different hops for an 5G SBI message mirror the message to monitor 102 for analysis).

FIG. 7 illustrates a computing system 700 that is representative of any system or collection of systems in which the various processes, systems, programs, services, and scenarios disclosed herein may be implemented. Examples of computing system 700 include, but are not limited to, desktop computers, laptop computers, server computers, routers, web servers, cloud computing platforms, and data center equipment, distributed computing systems, as well as any other type of physical or virtual server machine, physical or virtual router, container, and any variation or combination thereof. It should be understood virtualized components are executing on physical hardware like that of computing system 700.

Computing system 700 may be implemented as a single apparatus, system, or device or may be implemented in a distributed manner as multiple apparatuses, systems, or devices. Computing system 700 may include, but is not limited to, processing system 715, storage system 705, software 725, communication interface system 710, and user interface system 720. Processing system 715 may be operatively coupled with storage system 705, communication interface system 710, and user interface system 720.

Processing system 715 may load and execute software 725 from storage system 705. Software 725 may include and SCP or monitor process 730, which may be representative of any of the operations for 5G network monitoring and analysis using an enhanced 5G SBI traffic feed (e.g., operations 200 and 300). Accordingly, computing system 700 may be SCP 101 or monitor 102. Computing system 700 may also represent computing systems for consumer NFS 113 and producer NFs 114—including combinations thereof. When executed by processing system 715, software 725 may direct processing system 715 to operate as described herein for at least the various processes, operational scenarios, and sequences discussed in the foregoing implementations. Computing system 700 may optionally include additional devices, features, or functionality not discussed for purposes of brevity.

In some embodiments, processing system 715 may comprise a micro-processor and other circuitry that retrieves and executes software 725 from storage system 705. Processing system 715 may be implemented within a single processing device but may also be distributed across multiple processing devices or sub-systems that cooperate in executing program instructions. Examples of processing system 715 may include general purpose central processing units, graphical processing units, application specific processors, and logic devices, as well as any other type of processing device, combinations, or variations thereof.

Storage system 705 may comprise any memory device or computer readable storage media readable by processing system 715 and capable of storing software 725. Storage system 705 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a transitory form of signal transmission (often referred to as "signals per se"), such as a propagating electrical or electromagnetic signal or carrier wave.

In addition to computer readable storage media, in some implementations storage system 705 may also include computer readable communication media over which at least some of software 725 may be communicated internally or externally. Storage system 705 may be implemented as a single storage device but may also be implemented across multiple storage devices or sub-systems co-located or distributed relative to each other. Storage system 705 may comprise additional elements, such as a controller, capable of communicating with processing system 715 or possibly other systems.

Software 725 (including process 730 among other functions) may be implemented in program instructions that, when executed by processing system 715, direct processing system 715 to operate as described with respect to the various operational scenarios, sequences, and processes illustrated herein. For example, when process 730 is an SCP process software 725 may include program instructions for receiving a 5G SBI message in SCP, extracting information from protocols used to transmit the 5G SBI message, including the information in a mirror message with a copy of a payload of the 5G SBI message, and transmitting the mirror message to a monitoring system. When process 730 is a monitor process software 725 may include program instructions for receiving a mirror message from a Service Communication Proxy (SCP), wherein the mirror message includes information the SCP extracted from protocols used to transmit a 5G SBI message to the SCP and a copy of a payload of the 5G SBI message, identifying a transaction identifier for the 5G SBI message from the information, and associating the 5G SBI message with a transaction along with one or more other 5G SBI messages based on the transaction identifier.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 725 may include additional processes, programs, or components, such as operating system software, virtualization software, or other application software. Software 725 may also comprise firmware or some other form of machine-readable processing instructions executable by processing system 715.

In general, software 725 may, when loaded into processing system 715 and executed, transform a suitable apparatus, system, or device (of which computing system 700 is representative) overall from a general-purpose computing system into a special-purpose computing system customized to act, for example, as a slice breather or the like as described herein. Indeed, encoding software 725 on storage system 705 may transform the physical structure of storage system 705. The specific transformation of the physical structure may depend on various factors in different implementations of this description. Examples of such factors may include, but are not limited to, the technology used to implement the storage media of storage system 705 and whether the computer-storage media are characterized as primary or secondary storage, as well as other factors.

For example, if the computer readable storage media are implemented as semiconductor-based memory, software 725 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 710 may include communication connections and devices that allow for communication with other computing systems (not shown) over communication networks (not shown). Examples of communication connections and devices that together allow for inter-system communication may include network interface cards, antennas, power amplifiers, radio-frequency (RF) circuitry, transceivers, and other communication circuitry. The communication connections and devices may communicate over communication media to exchange communications with other computing systems or networks of systems, such as metal, glass, air, or any other suitable communication media.

Communication between computing system 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the only system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for capturing detail about 5G Service Based Interface (SBI) messages to enhance traffic monitoring and analysis, the method comprising:
  receiving a 5G SBI message in a Service Communication Proxy (SCP);
  extracting information from protocols used to transmit the 5G SBI message;
  generating a mirror message with a JavaScript Object Notation (JSON) payload including the information and a copy of a payload of the 5G SBI message; and
  transmitting the mirror message to a monitoring system.

2. The method of claim 1, wherein the 5G SBI message is received from a consumer network function and is directed to a producer network function.

3. The method of claim 2, wherein the information identifies the consumer network function as a source of the 5G SBI message and the producer network function as a destination for the 5G SBI message.

4. The method of claim 1, comprising:
  receiving another 5G SBI message in the SCP;
  extracting additional information from the protocols used to transmit the other 5G SBI message;
  generating another mirror message including the additional information and a copy of a payload of the other 5G SBI message; and
  transmitting the other mirror message to the monitoring system.

5. The method of claim 4, wherein the monitoring system determines the 5G SBI message and the other 5G SBI message are associated with a same transaction based on the information and the additional information.

6. The method of claim 5, wherein the 5G SBI message is a 5G SBI request and the other 5G SBI message is a 5G SBI response.

7. The method of claim 1, wherein the information includes an HTTP/2 stream identifier.

8. The method of claim 1, wherein the JSON payload includes message headers received by the SCP with the 5G SBI message.

9. The method of claim 1, wherein the protocols include one or more from a protocol group including:
  HTTP/2;
  TLS;
  TCP; and
  IP.

10. An apparatus of a Service Communication Proxy (SCP) to capture detail about 5G Service Based Interface (SBI) messages to enhance traffic monitoring and analysis, the apparatus comprising:
  one or more computer readable storage media;
  a processing system operatively coupled with the one or more computer readable storage media; and
  program instructions stored on the one or more computer readable storage media that, when read and executed by the processing system, direct the apparatus to:
    receive a 5G SBI message in the SCP;
    extract information from protocols used to transmit the 5G SBI message;
    generate a mirror message with a JavaScript Object Notation (JSON) payload including the information in a mirror message and a copy of a payload of the 5G SBI message; and
    transmit the mirror message to a monitoring system.

11. The apparatus of claim 10, wherein the 5G SBI message is received from a consumer network function and is directed to a producer network function.

12. The apparatus of claim 11, wherein the information identifies the consumer network function as a source of the 5G SBI message and the producer network function as a destination for the 5G SBI message.

13. The apparatus of claim 10, wherein the program instructions direct the processing system to:
  receive another 5G SBI message in the SCP;
  extract additional information from the protocols used to transmit the other 5G SBI message;
  generate another mirror message including the additional information and a copy of a payload of the other 5G SBI message; and
  transmit the other mirror message to the monitoring system.

14. The apparatus of claim 13, wherein the monitoring system determines the 5G SBI message and the other 5G SBI message are associated with a same transaction based on the information and the additional information.

15. The apparatus of claim 14, wherein the 5G SBI message is a 5G SBI request and the other 5G SBI message is a 5G SBI response.

16. The apparatus of claim 10, wherein the information includes a timestamp of when the 5G SBI is received.

17. The apparatus of claim 10, wherein the JSON payload includes message headers received by the SCP with the 5G SBI message.

18. The apparatus of claim 10, wherein the protocols include one or more from a protocol group including:
  HTTP/2;
  TLS;
  TCP; and
  IP.

19. A method for capturing detail about 5G Service Based Interface (SBI) messages to enhance traffic monitoring and analysis, the method comprising:

in a monitoring system, receiving a mirror message from a Service Communication Proxy (SCP), wherein the mirror message comprises a JSON payload including information the SCP extracted from protocols used to transmit a 5G SBI message to the SCP and a copy of a payload of the 5G SBI message;

in the monitoring system, identifying a transaction identifier for the 5G SBI message from the information; and in the monitoring system, associating the 5G SBI message with a transaction along with one or more other 5G SBI messages based on the transaction identifier.

20. The method of claim 19, wherein the JSON payload includes message headers received by the SCP with the 5G SBI message.

* * * * *